United States Patent Office 3,699,090
Patented Oct. 17, 1972

3,699,090
COPOLYMERS OF N-BUTENE AND 4 METHYL PENTENE-1
Roger M. Nagel, Pennington, N.J., assignor to Petro-Tex Chemical Corporation, Houston, Tex.
No Drawing. Filed Dec. 16, 1966, Ser. No. 602,130
Int. Cl. C08f 15/04
U.S. Cl. 260—88.2
2 Claims

ABSTRACT OF THE DISCLOSURE

Copolymers of about 85 to 99.5% n-butene and about .5 to 15% 4-methyl pentene-1 and process of preparation using a Ziegler catalyst.

---

This invention relates to a novel composition of matter exhibiting improved physical characteristics and a process for making the novel composition. Broadly, the invention concerns a polybutene copolymer characterized by high clarity. More particularly, the invention is directed to a copolymer of butenes and 4-methyl pentene-1, and to a method of making the copolymer.

Because of its superior thermoplastic properties and stability, polybutene is well suited for use in articles such as thin walled irrigation tubing, fertilizer bags, sheets of polymer film, etc. While polybutene is readily adapted to film applications, the use of the material in certain articles is undesirable, from a commercial standpoint, since the material is normally translucent. The advantages of a material having superior thermoplastic properties as well as high transparency are quite obvious.

Accordingly, it is an object of this invention to provide a butene-4 methylpentene-1 copolymer having improved physical properties, and a method of producing the copolymer.

Another object of this invention is to provide a butene-4 methylpentene-1 copolymer having improved transparency and good tensile strength. It is more particularly an object of this invention to provide a butene-4 methylpentene-1 composition which is suitable for making articles such as bags, films, packaging materials, and the like, where high transparency and increased tensile strength are desired characteristics.

It has now been found, quite unexpectedly, that these and other objects are attained by the novel composition and process of this invention. Surprisingly, it has been found that a copolymer of monomers comprising or consisting essentially of butene and 4 methylpentene-1, wherein the proportions or ratio of the monomers prior to reaction are from 85% to 99.5% (by weight) butene (present as butene-1, butene-2 or mixtures thereof) and from 1.0% and about 7% 4 methylpentene-1, exhibits superior thermoplastic properties with a high degree of transparency. The preferred butene is n-butene-1. The copolymer is prepared in the presence of so called Ziegler catalysts, as more particularly described hereafter. While copolymerized products containing 4 methyl-pentene-1 and butene are known in the art, for example, those disclosed in British Pat. 1,026,437, it could not be predicted that polymers of butenes and 4 methylpentene-1 in the proportions of the invention would exhibit improved tensile strength and be suitable for packaging, films, etc., since it was formerly though that copolymers containing more than 30 percent butene would be unsuitably soft. In actuality, samples of the copolymer containing between about 1.0% and about 7% (preferred proportions) show substantially greater tensile strength than polybutene-1. Additionally, it could not be predicted that copolymers containing such large amounts of butenes would be transparent since polybutene-1 is normally translucent. The copolymers of the invention have molecular weights of at least about 200,000. The molecular weights may run as high as several million or more; however, polymers having weights from about 450,000 to about 3,000,000 are preferred. The aforementioned molecular weights are based on standard melt index determinations. Densities of the copolymers of the invention range from about 0.9090 to about .8600 (ASTM D1505–63T).

The copolymers of this invention can be obtained by utilizing a variety of polymerization catalysts. Generally, the copolymerization reaction is conducted in the presence of a Ziegler type polymerization catalyst comprising a transitional metal compound such as a transitional metal halide and a reducing component consisting normally of a metal alkyl compound. Representative transitional metal compounds which may be used include those selected from Groups IVb, Vb and VIb of the Periodic Table.[1]. Included in the preferred species are the halides of metals selected from the groups consisting of Groups VIb, Vb, IVb of the Periodic Table and particularly the titanium halides such as titanium tetrachloride, titanium trichloride, and titanium dichloride, and mixtures thereof. Other metal compounds, such as zirconium tetrahalide, vanadium chloride, chrominum chloride, tungsten chloride and the like are also useful. Still other transitional metal halides containing halogens selected from the group consisting of bromine, iodine, chlorine and in certain instances fluorine, can also be used.

The reducing component of a Ziegler catalyst composition may be any of a variety of reducing agents. Most common among the reducing agents are organometallic compounds such as alkyl aluminum compounds, including triethylaluminum, tripopyl aluminum, diethylaluminum chloride, aluminum sesquichloride, ethyl aluminum dichloride, diethylaluminum hydride, aluminum trisobutyl, aluminum triisopropyl and related compounds. Many other reducing agents, such as lithium aluminum hydride, hydrogen, titanium, and the like, are described in the literature as useful reducing agents and can also be used. However, the alkyl aluminum halides (mono- and di-) and the trialkyl aluminum compounds are preferred in the practice of the invention. The alkyl groups of the metal alkyls will preferably have from 2 to 4 carbon atoms. These catalysts are of the now well known "Ziegler" variety. Organometallic compounds such as the aluminum alkyl compounds selected from the group consisting of triethylaluminum, diethylaluminum chloride, aluminum sesquichloride and aluminum ethyldichloride are particularly useful. A preferred catalyst system is that disclosed in U.S. 3,197,452 patented July 27, 1965, particularly where titanium trichloride is the transition metal compound and the other catalytic component is diethylaluminum chloride or aluminum sesquichloride.

In the catalytic complex comprising a transitional metal compound and a reducing component, the ratio of constituents may be varied over a relatively broad range. The preferred range depends to a large extent on the operating conditions, the choice of catalytic ingredients, and the type of polymer desired. Broadly speaking, though, where the transitional metal compound is a titanium halide and the reducing component is an alkyl aluminum compound, the ratio of the aluminum compound may be varied from about 0.5 to 5 mols or even from 0.5 to 10 mols of aluminum compound per mol of titanium halide. However, preferably, the reducing component (e.g., triethyl aluminum) is normally present in excess of the transitional metal compound.

In using the above catalysts, a number of procedures may be employed. For example, the catalyst complex ---
[1] Pages 448 and 449, Handbook of Chemistry and Physics, 43rd edition, Chemical Rubber Publishing Company, 1961–1962.

may be pre-formed and pre-activated prior to combining the complex with the hydrocarbon feed. In another technique, the catalyst may be combined in an inert solvent and this slurry added to or combined with the hydrocarbon feed. In some instances, the catalyst components may be added directly to the hydrocarbon feed. While the catalyst may be prepared over a wide range of temperatures, the catalyst is usually prepared at a temperature of between 30° C. and 150° C. The amount of catalyst used may be varied quite widely and may be as low as 0.01 weight percent based on the weight of the butene being copolymerized. Generally, catalytic quantities in an amount of between 0.01 to about 10 weight percent are utilized. The copolymerization reaction is normally conducted at temperatures of between about 0° C. and about 150° C. and at about 0.5 to 50 atmospheres. Preferred reaction conditions are a temperature of from 0° C. to 100° C. and from 1 to 10 atmospheres of pressure.

The copolymerization is preferably carried out in bulk, but may be conducted in an inert diluent having three to six carbon atoms. Preferred diluents are the inert liquid hydrocarbons such as propane, butane, pentane, heptane and the like; nevertheless, such materials as isooctane, cyclohexane, benzene, toluene and the like are also useful. However, the copolymerization is preferably conducted in the absence of a diluent, i.e., in the presence essentially of only the reactants and catalyst. The copolymer formed by the above described processes may then be solidified in free flowing particulate form with a high bulk density after stopping the reaction by deactivating the catalyst, as with an alcohol.

A further discussion of the type catalyst employed in the present invention can be found in the Ziegler et al., patent U.S. 3,113,115, issued Dec. 3, 1963, and in the Seelbach et al., patent U.S. 2,964,510, issued Dec. 13, 1960.

The following examples of the preparation of the copolymers of this invention are intended for illustrative purposes only and are not intended as a limitation on the scope of the invention.

EXAMPLE 1

A reactor was cleaned, dried, and purged with $N_2$. The catalyst was prepared by adding a solution of 1.03 g. $Et_3Al$ in 100 mls. heptane rapidly in one minute at 72–73° C. to a solution of 4.75 $TiCl_4$ in 100 mls. heptane in the reactor. After aging for 20 minutes, a solution of 6.05 g. $Et_2AlCl$ in 100 mls. heptane was added rapidly in about one minute followed by aging 20 minutes as the temperature was decreased to 52° C. The catalyst was now ready for the copolymerization. A charge of 488 grams containing 95% by weight butene-1 and 5% by weight 4 methylpentene-1 was then introduced into the autoclave. Polymerization was carried out for 3.5 hours at 43–57° C. to give a yield of 372 grams product characterized by an ether-insolubility (on extraction) of over 80 percent. The copolymer exhibited high clarity and increased tensile strength. Table I below summarizes its properties in comparison with those of a typical sample of polybutene-1.

TABLE I

| | Melt index | Clarity | Density | Tensile strength, p.s.i. | Melting point, °C. | Yield point, p.s.i. |
|---|---|---|---|---|---|---|
| Polybutene-1 | 0.14 | Translucent | 0.912 | 3,021 | 120 | 1,940 |
| Butene-1 4 methylpentene-1 copolymer (5%) | 0 | Very clear | 0.882 | 3,897 | 122 | 1,153 |

EXAMPLES 2 AND 3

A procedure similar to that in Example 1 was followed in two runs using 1.49 percent and 2.57 percent 4 methylpentene-1. Each sample exhibited a high transparency and tensile strength greater than that of polybutene-1. The results are shown below.

TABLE II

| | Butene-1 4 methylpentene-1 copolymer | Melt Index | Clarity | Density | Tensile strength, p.s.i. | Yield point, p.s.i. |
|---|---|---|---|---|---|---|
| (2) | 1.49 | 0.7 | Very clear | 0.9058 | 3,640 | 950 |
| (3) | 2.57 | 0.1 | do | 0.9060 | 3,720 | 1,120 |

While there are above disclosed but a limited number of embodiments of the process and product of the invention herein presented, it is possible to produce still other embodiments without departing from the inventive concept herein disclosed, and it is desired therefore that only such limitations be imposed on the appended claims as are stated therein, or required by the prior art.

I claim:

1. The copolymer of monomers consisting of (A) butene-1 and (B) 4-methylpentene-1, the ratio of (B) to (A) being from 1.0% to 7% by weight (B) to 93 to 99% (A); said copolymers having a density of at least .86.

2. The copolymer of claim 1 wherein the said butene-1 is about 95% by weight and the said 4-methylpentene-1 is about 5% by weight.

References Cited

UNITED STATES PATENTS

| | | | |
|---|---|---|---|
| 3,010,949 | 11/1961 | Price | 260—88.2 |
| 3,265,622 | 8/1966 | Anderson | 252—59 |
| 3,332,920 | 7/1967 | Clark | 260—88.2 |
| 3,029,215 | 4/1962 | Campbell | 260—33.6 |
| 3,278,510 | 10/1966 | Ingberman | 260—93.7 |

OTHER REFERENCES

Chemical Abstracts: vol. 63:5776d, moldable, transparent copolymers of alkenes obtained with titanium halides and organoaluminum halides as catalysts.

Chemical Abstracts: vol. 62:7894f, 4-methyl-1-pentene copolymers.

Jones, A. Turner, copolymers of butene with alpha-olefins, Journal of Polymer Science, Part C, Polymer Symposia No. 16 pp. 393–402. International Symposium on Marcromolecular Chemistry, Prague, 1965, Part 1.

JOSEPH L. SCHOFER, Primary Examiner

R. S. BENJAMIN, Assistant Examiner